Oct. 10, 1967

R. B. BECHTEL 3,346,866

METHOD AND APPARATUS FOR PERFORMING A HODOMETER FLOOR USE STUDY

Filed Oct. 4, 1965

INVENTOR
Robert B. Bechtel

BY
ATTORNEYS.

Fig. 3.

Oct. 10, 1967  R. B. BECHTEL  3,346,866
METHOD AND APPARATUS FOR PERFORMING A HODOMETER FLOOR USE STUDY
Filed Oct. 4, 1965  3 Sheets-Sheet 3

INVENTOR
Robert B. Bechtel

United States Patent Office 3,346,866
Patented Oct. 10, 1967

3,346,866
METHOD AND APPARATUS FOR PERFORMING A HODOMETER FLOOR USE STUDY
Robert B. Bechtel, Lawrence, Kans., assignor to Environmental Research Foundation, Topeka, Kans., a corporation of Kansas
Filed Oct. 4, 1965, Ser. No. 492,619
6 Claims. (Cl. 346—1)

This invention relates to a method and an apparatus for measuring foot movement and the topological movement of humans across a floor space.

One of the basic objects of my invention is to provide a method and apparatus for testing the effect of architectural and environmental stimuli without actually permanently building the structure under test.

A principal object of my invention is to provide a system which will automatically record the pattern and frequency of movement across a floor space and give occupancy time at a particular area or segment of the floor as well.

Another object of my invention is to provide a method for recording the number of foot movements in relation to any part of a floor space so that the number of these movements can be related statistically to the area or areas concerned regardless of topological movement. Even if the subject is not in motion, a shifting of weight from foot to foot or the making of slight changes in the position of a foot will be recorded even though the subject may appear to be standing still. Thus, foot movements per se are significant data in addition to the patterns and densities of total movement.

A further object of my invention is to provide a method for measuring topological body movement of a test subject in a defined test area comprising the steps of detecting the presence and movement of said test subject within said test area, counting the number of times the test subject moves from one portion of said test area to another, and timing the presence of the test subject at each portion of said test area.

Another object of my invention is to provide a remote installation including a light panel for visually observing, at the remote station, the movement pattern of animate objects in or through a particular room, said observation being facilitated by the use of electric switch mats selectively spaced throughout the room and operatively connected with a like number of counters and lights.

Another object of my invention is to provide a system of the character described which includes a novel relay circuit for appropriately operating a clock timer and a time lapse electrically operated camera in response to the movement of people walking about a room, said clock timer and said light panel correlated with said camera that the pattern and frequency of movement across the floor space in said room may be recorded.

A still further object of the invention is to provide an apparatus of the character described which is rugged, transportable, easily assembled, and which eliminates the human error factor resulting from utilizing observers.

Other and further objects of the invention will appear in the course of the following description thereof.

In the drawings, which form a part of the instant specification and are to be read in conjunction therewith, an embodiment of the invention is shown and, in the various views, like numerals are employed to indicate like parts.

FIG. 3 is a schematic circuit diagram of the system including the relay circuit used in the movement measuring apparatus.

Figure 1:
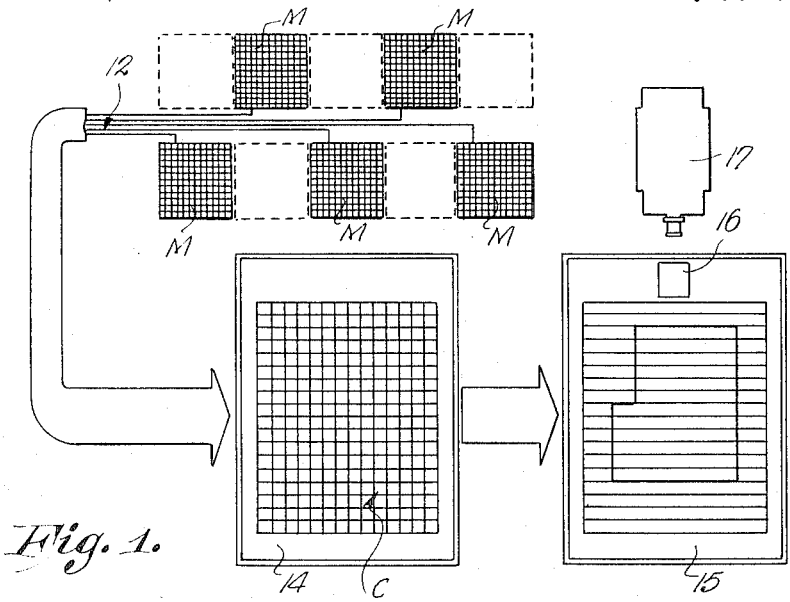
FIG. 1 is a schematic diagram of the movement measuring device.
Figure 2:
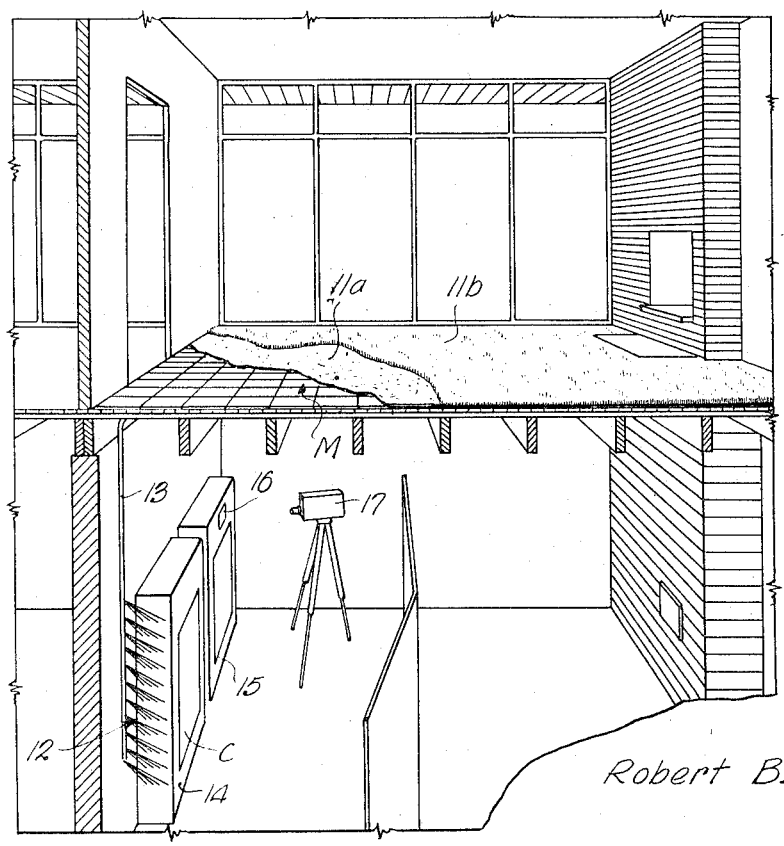
FIG. 2 is a fragmentary sectional view of a typical room-sized installation with a portion of the upper floor covering broken away to show the electrical contact mats.
Figure 3:
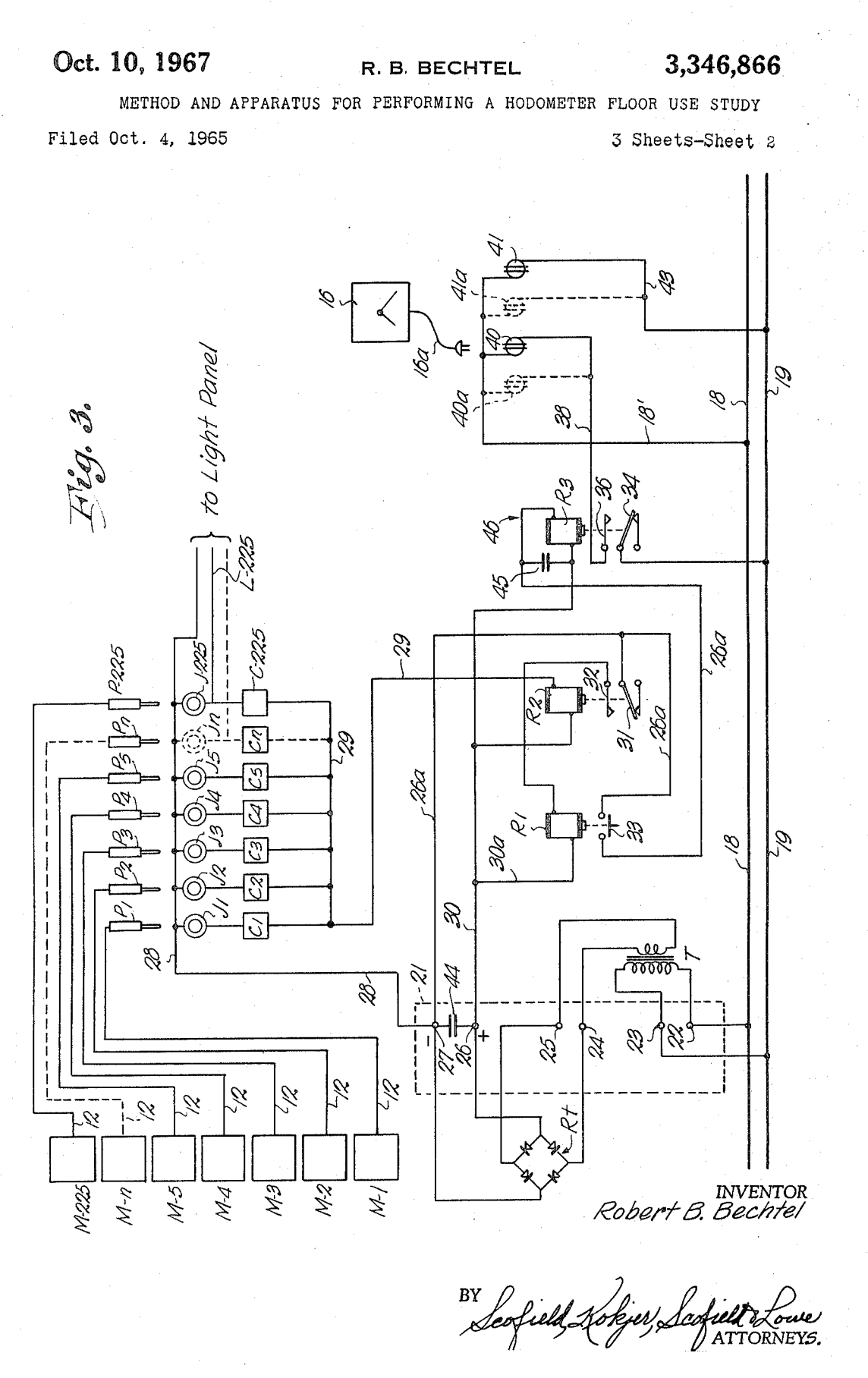

Referring now more particularly to the drawings, a series of selectively spaced electric switch mats generally shown at M in FIGS. 1 and 2, and as M1–225 in FIG. 3, are placed in the room or test area in which movement is to be measured. The mats may be of any convenient size, usually 12" x 12" and comprise two metal plates separated at the edges and center by resilient insulation. The plates within a mat form a normally open, pressure sensitive switch which is entirely encased in a suitable insulated covering and, as such, is then concealed beneath a pad 11a and a carpet 11b as part of a preselected pattern. The type of test being run will dictate the pattern and the spacing of the switch mats as the mats may be spaced side by side or alternately in various patterns with blank mats separating sensitive mats so that a more coarse measure may be had. The mats and their associated normally open switches located within, are additionally preselected for optimal sensitivity, e.g., in most cases four pounds per square inch is light enough to detect and register the type of movement which can be esoterically interpreted.

The mats, shown in FIG. 1, are alternately spaced with the blank mats shown in broken lines in FIG. 1. Each mat M is connected with a lead wire generally shown at 12. The wires coming from each individual mat are appropriately gathered, bound in flat bundles, and positioned within conduit 13. Conduit 13 runs from a portion of the floor near the wall to a suitable test equipment area, shown as the lower floor in FIG. 2, remotely located from the room under test.

As mentioned above, the floor plan of the room and the type of test being run will dictate the pattern and number of switch mats that are needed for optimal testing. For example, if a test were being run on a room 15 feet square and the usual 12" x 12" mats were laid side by side, the room would need 225 switch mats appropriately laid with the accompanying lead wires 12 running therefrom. Each wire 12 is equipped with a plug, shown as P1–225 in FIG. 3. The plugs are inserted into a corresponding series of jacks J1–225 which are mounted on Masonite in the side or back of console cabinet 14. These jacks are permanently connected to a series of conventional counters C1–225, there being the same number of counters as there are mats and lead wires.

During the movement measurement test period, counter C registers each time that a mat is stepped on or each time that the foot or a portion of the body shifts to put the required four pounds per square inch of pressure on an adjacent mat. As a practical matter for installation purposes, each mat will be numbered with a corresponding number for every plug, jack and counter, thus facilitating easy moving and set up of the test equipment at different sites.

The conventional counters C are housed within console cabinet 14, having their numerical register visually displayed on one side, and will register each time the respective normally open switch mat contacts are closed. Each switch mat that is utilized in the test includes at least one parallel connected signal light L1–225 which will be lighted upon the closing of the normally open contacts within the corresponding mat. The signal light remains ON until there is no longer sufficient pressure on its corresponding switch mat to maintain the associated contacts in a closed position. The light is positioned on light panel 15 to form a miniature floor plan that corresponds with the relative position of the mats. The lights are physically arranged on panel 15 in rows and column facilitating connecting the appropriately numbered switch mat lead wire with the corresponding light. Thus due to the physical arrangement of lights, the floor plan is easily simulated and a visual indication of which contact mats are currently bearing the traffic is had.

While the combination counter arrangement and light panel will yield a significant amount of data, my invention includes the utilization of a clock timer 16 and a time lapse camera 17. The clock timer 16 is mounted on light panel 15 and so oriented that camera 17 will be able to photograph the entire light panel face including the individual lights, as well as the face of the clock itself. The clock and camera may be controlled by a relay circuit, details of which will be later described, and as such permanently record sufficient data to indicate with the movement pattern. The camera is of a conventional type which automatically photographs the panel at an interval of one second.

The above-mentioned relay system energizes the counters and additionally provides a means for controlling the clock-timer 16 in accordance with the movement or presence of a test subject within the test area. After one of the counters has been energized due to the closing of a corresponding switch mat contact, the system sequentially operates to "turn on" the clock depending upon which outlet is being used to run clock 16. The clock may alternately be connected in parallel with the camera which, if used, runs continuously during the testing.

For recording purposes, the counter gives an indication of the number of times a particular mat has had its switch contacts closed thus indicating the presence of the test subject. The clock provides a means to time the presence of the test subject on a mat and thus facilitates in determining the speed of movement within the test area.

The camera may be used to record, in timed intervals, the condition of the light panel including clock 16. With these three data readings, specially trained personnel are able to test the effect of environmental stimuli without being present during the time the test subject is within the test area.

The operation of my invention can best be described by reference to the schematic of the power supply and relay system utilized therein. As shown in FIG. 3, the voltage input to the entire system including the counters is supplied by a conventional 110 volt, 60 cycle AC source depicted by power lines 18 and 19. A six terminal strip 21 is provided for easy hookup with the remainder of the circuit, and includes terminals 22 and 23 tapped across lines 18 and 19. Terminals 22 and 23 are connected directly to a stepped-down transformer T which steps the voltage down from 110 volts AC to 24 volts AC across the secondary winding thereof. The 24 volts AC are directly applied to the second pair of terminals 24 and 25 of termnal strip 21. These terminals have a full wave rectifier RT shunted across them. The rectifier converts the 24 volt AC to 24 volt DC and as such is impressed across terminals 26 and 27 with terminal 26 being positive relative to terminal 27. Capacitor 44 is provided to smooth out any AC ripple that might be present. Negative terminal 27 is directly connected to one side of the counter circuit through jacks J by a common line 28. The output side of the counters are tied together with common line 29 which runs through a current operated relay winding R2 and to positive terminal 26 via wire 30. With the plugs P1–225 inserted in the permanent jacks J1–225, whenever the normally open contacts of any one of mats M1–225 are closed the circuit is completed with the 24 volt DC operating the appropriate counter or counters and resulting a current flow through the current operated relay coil R2.

Simultaneous with the operation and registering of any one of the counters C, the parallel connected lights in light panel 15 (FIGS. 1 and 2) will correspondingly light up to indicate the test subject's position in the test area.

The clock-timer may be selectively plugged into outlets which will either continuously cause the clock to run or connected with an optional outlet bank which will be supervised by the hereinafter mentioned relay circuit. With the counters and light panel both in operation the relay circuit will automatically initiate the clock-timer if not continuously operated.

The current flow through relay coil R1, causes its associated single pole double throw contact 31 to make contact with pole 32. This action brings relay winding R1 across terminals 26 and 27 via lines 30a and 26a and closes the R1 single pole single throw contact 33. The presence of relay R1 merely serves to reduce the load and protect the contacts associated with relay coil R2.

When contact 33 closes, relay coil R3, which is shunted by capacitor 45 is now also connected across terminals 26 and 27 via lines 26a and 30, resulting in a sufficient current flow through relay coil R3 to cause its double pole single throw contact 34 to "contact" pole 36. The current flow in closed loop 46 divides sufficiently to charge capacitor 45 through a suitable circuit resistance (not shown). Pole 36 is connected to wire 38 which runs to one side of receptacle outlet 40. The other side of receptacle 40 is directly connected to power line 18 by wire 18'. Wire 18' additionally is connected to one side of receptacle outlet 41 with its other side connected permanently to line 19 via wire 43.

Clock 16 is electrically operated and may be connected to either receptacle outlet 40 or 41 by a conventional cord 16a. Receptacle 40 is controlled by the relay system and as such will only be energized when the test subject is actually closing a switch mat contact. Receptacle 41 is tied directly across the power source and it causes its associated equipment to run continuously. Both receptacles 40 and 41 include parallel connected outlets shown in broken line at 40a and 41a in FIG. 3, to similarly operate other equipment. If camera 17 is used in the test, it is powered from receptacle 41.

The type of test being run will determine which receptacle is used for running clock 16. If the mats are staggered there is, of course, no reason for switching the clock "OFF" when the test subject is on a blank mat. However, if the entire area is covered with mats, receptacle 40 will then be used and the clock will be energized according to the presence of the test subject in the test area. In certain situations, it is possible that the test subject could be standing on the insulation area where the four corners of mats meet. This may cause the contacts to open and shut the clock off before the test subject is actually out of the test area. Capacitor 45 is provided to keep relay contacts 34 closed during the very brief periods when a mat is not registering correctly. With contact 33 open due to the opening of the mats constant, capacitor 45 will discharge through coil R3 for a four second interval. This capacitor discharge keeps contacts 34 closed with pole 36 and the clock running for a prescribed time. The fact that a four second error has been inserted into the data is easily interpolated out and presents less of a problem than if the uncertain error of the test subject stepping on non-sensitive areas was not accounted for.

One example of how the test system may be effectively used is in the field of predicting artistic preferences from a plurality of test subjects, by observing the movement pattern in and through an art museum.

Figure 4:
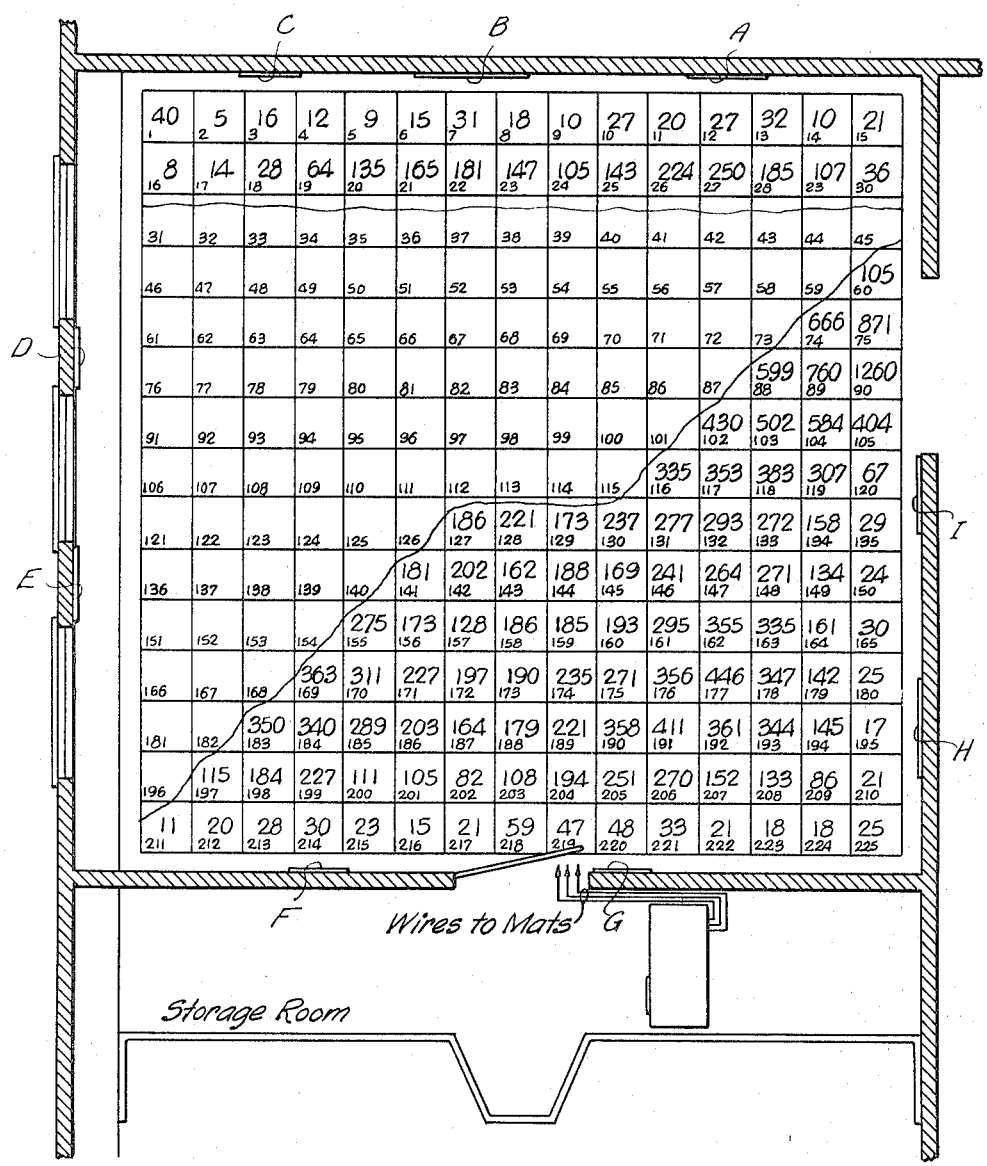
FIG. 4 is a view of a typical data sheet used by data analysts or observers. The switch mats shown therein are numbered 1 through 225 with that portion of the mats within the irregular dividing lines also containing cumulative data figures.

FIG. 4 shows a floor plan of a typical test area in a museum with certain objects such as pictures A, B, C, D, E, F, G, H and I are hanging on the walls of the test area in their relative positions. The smaller numbers shown in the left hand corner of each square corresponds to the numbered switch mats M, located therein. The larger numbers represent cumulative data taken from the system apparatus and written in by test analysts or observers. These numbers are shown in only the portions of the data sheet within the irregular lines for exemplary purposes.

In the initial stages of the data analysis, observers will utilize the floor plan as a data sheet and will record such information as the number of times a particular switch mat is stepped on or energized and also he may additionally record the length of time that said mat is energized. When first setting up the testing system, the test subjects will be handed a rating questionnaire before entering the test area. The questionnaire will include such personal questions as age, sex, education, and finally a list of the pictures A through I and a notation asking the test subject to rate the pictures according to preference.

Data sheets similar to the one shown in FIG. 4, which are in the hands of the test observers, will have certain switch mat patterns relegated to each picture. The size and the shape of the switch mat pattern will depend upon the size and the shape of the test object. For example, if the test object is a picture three feet wide hanging on a wall of the test area, the picture would be assigned a switch mat pattern of the three mats (the mats being one foot square) immediately in front of the picture and probably the next five mats which extend into the test area from each one of the first three. This results in a three-foot by six-foot or eighteen mat test mat pattern. Accordingly, each picture will be assigned its appropriate test mat pattern. The observer records on the data sheet in a corresponding numbered square each time a switch mat has been energized. However, the test mat pattern will be significant in final data analysis.

After the test subject leaves the test area, the rankings of the test objects are reported in the questionnaire. A test is run over a given length of time, for example, one month. After such time, all rankings are compared with the total number of times each individual mat within a given test mat pattern for a particular picture was stepped on. The picture preference may then be related to the energization of switch mats within a test mat pattern. It is then possible to perform the test without the use of questionnaires and the liking or preference for other pictures can be predicted at a very high level of probability from the movement of the test subjects within the test area.

Additional vital information may be had by using the time recorded by the light-panel-time-camera data as a still further method of predicting the picture preference from movement patterns and frequency of movement.

It is also contemplated that computer equipment can be attached to the output of the counters to record the cumulative frequency with which each mat is actuated. The computers could also be used to record the distribution of time each mat is stepped on during a predetermined interval and to record the directional sequence of motion over a limited number of mats. It should be pointed out that other statistical techniques for utilizing the accumulated data may be derived and that the above are only examples of possible uses of the present invention.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. The method of measuring topological foot movement of a test subject in a defined test area having a plurality of sensitive portions located therein, said method comprising the steps of
detecting the presence of a foot or feet of the test subject on said sensitive portions of the test area,
counting the number of times that the test subject moves upon said sensitive portions,
timing the presence of the test subject on the sensitive portion of said area,
visually indicating the position of the test subject on a light panel, and
photographing the light panel at preselected time intervals to assist in obtaining a direction of movement indication of the test subject.

2. In a system for measuring the topological foot movement of a test subject in a defined test area comprising
a plurlity of switches selectively spaced in said test area,
a counter connected to each switch, said counter registering each time a foot of the test subject is moved thereon under a preselected amount of pressure,
means connected with said switches for visually displaying the position of said test subject within said test area,
means connected to said counter for timing the presence of said test subject on each portion of said test area that is switched into the counter registering state, and
a time lapse camera operable to photograph said visually displaying means at preselected time intervals, thereby assisting in obtaining a direction of movement indication of the test subject.

3. In a system for measuring the topological body movement of a test subject on a defined area comprising,
a source of electric power,
a plurality of pressure sensitive switch mats selectively spaced in said test area, said switch mats having normally open contacts therein connected to one side of said power source,
a counter connected to each switch mat, said counter registering each time said normally open contacts close, said plurality of counters having a common output connected through a first relay coil to the opposite side of said power source, said relay coil being energized with said registering of a counter,
a second relay coil directly connected to one side of said power source and connected to the opposite side of said power source through a relay contact controlled by the energization of said first relay coil, and
an outlet receptacle having one side connected to one side of said power source and its opposite side connected to the opposite side of said power source through contact controlled by the second relay coil.

4. A system as in claim 3 including
a light panel having each light therein connected in parallel with a corresponding counter and with corresponding normally open switch contacts,
said light panel having each light mounted on a console in a pattern simulating the shape of the test area and the relative positions of the switches.

5. A system as in claim 4 wherein an electrically operated clock is mounted on said console, said clock connected with said power source via said receptacle.

6. A system as in claim 5 including an electrically operated time lapse camera connected across said power source, said camera oriented with respect to said console to photograph said light panel and said clock.

References Cited
UNITED STATES PATENTS

| | | | |
|---|---|---|---|
| 1,257,873 | 2/1918 | Johnson | 340—278 |
| 2,092,178 | 9/1937 | Murphy | 340—272 |
| 2,262,435 | 11/1941 | Waterman | 235—99 X |
| 2,392,890 | 1/1946 | Vincent et al. | 346—107 X |
| 2,951,737 | 9/1960 | Austin | 346—40 |
| 3,063,630 | 11/1962 | Cromley et al. | 235—92 |
| 3,114,128 | 12/1963 | Lyungman et al. | 340—258 |

RICHARD B. WILKINSON, *Primary Examiner.*

J. W. HARTARY, *Examiner.*